(12) United States Patent
Shahana et al.

(10) Patent No.: US 12,103,638 B2
(45) Date of Patent: Oct. 1, 2024

(54) HUMAN-POWERED VEHICLE CONTROL DEVICE

(71) Applicant: Shimano Inc., Osaka (JP)

(72) Inventors: Satoshi Shahana, Osaka (JP);
Yukinobu Nakamura, Osaka (JP);
Mitsuhiko Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 574 days.

(21) Appl. No.: 17/505,908

(22) Filed: Oct. 20, 2021

(65) Prior Publication Data

US 2022/0135177 A1 May 5, 2022

(30) Foreign Application Priority Data

Oct. 30, 2020 (JP) .................. 2020-183007

(51) Int. Cl.
*B62M 6/55* (2010.01)
(52) U.S. Cl.
CPC ..................... *B62M 6/55* (2013.01)
(58) Field of Classification Search
CPC . B62M 6/55; B62M 6/50; B62M 6/45; B62M 25/08; B62M 2025/006; B62M 9/123; B62M 9/133; B62J 45/41; B62J 45/4152; B62K 25/286; B62K 25/30
See application file for complete search history.

(56) References Cited

U.S. PATENT DOCUMENTS

| 2,884,292 | A | 4/1959 | Doner | |
|---|---|---|---|---|
| 3,940,938 | A | 3/1976 | Durham et al. | |
| 5,979,904 | A | 11/1999 | Balsells | |
| 8,768,585 | B2 | 7/2014 | Cheng | |
| 2017/0334514 | A1* | 11/2017 | Chen | B62M 6/55 |
| 2018/0118305 | A1* | 5/2018 | Tsuchizawa | B62M 25/08 |
| 2019/0127021 | A1* | 5/2019 | Shahana | B62M 6/50 |
| 2019/0291813 | A1* | 9/2019 | Tsuchizawa | B60L 50/60 |
| 2019/0291814 | A1* | 9/2019 | Tsuchizawa | B62M 6/45 |
| 2020/0262510 | A1* | 8/2020 | Hahn | B62M 6/45 |

FOREIGN PATENT DOCUMENTS

| DE | 2256542 | 5/1973 |
|---|---|---|
| JP | 2000-38187 A | 2/2000 |

* cited by examiner

Primary Examiner — Lori Wu
(74) Attorney, Agent, or Firm — Global IP Counselors, LLP

(57) ABSTRACT

A human-powered vehicle control device is for a human-powered vehicle. The human-powered vehicle includes a motor that applies a propulsion force to the human-powered vehicle and a shifting device that changes a transmission ratio, which is a ratio of a rotational speed of a wheel of the human-powered vehicle to a rotational speed of a crank of the human-powered vehicle. The human-powered vehicle control device includes an electronic controller that is configured to control the shifting device to change the transmission ratio in accordance with a comparison of a first parameter related to the human-powered vehicle and a predetermined threshold value. In a case where an output of the motor decreases as a vehicle speed of the human-powered vehicle increases, the electronic controller is configured to change the predetermined threshold value.

18 Claims, 6 Drawing Sheets

HUMAN-POWERED VEHICLE CONTROL DEVICE

CROSS-REFERENCE TO RELATED APPLICATIONS

This application claims priority to Japanese Patent Application No. 2020-183007, filed on Oct. 30, 2020. The entire disclosure of Japanese Patent Application No. 2020-183007 is hereby incorporated herein by reference.

BACKGROUND

Technical Field

The present disclosure generally relates to a human-powered vehicle control device for a human-powered vehicle.

Background Information

Japanese Laid-Open Patent Publication No. 2000-38187 (Patent Document 1) discloses an example of a control device for a human-powered vehicle. The control device changes a threshold value that is used for shifting a shifting device in accordance with a travel mode selected by the user or an average value of human driving force.

SUMMARY

With the human-powered vehicle control device for a human-powered vehicle disclosed in Patent Document 1, in order to change the threshold value used for shifting the shifting device, the user needs to select an operating mode or change the average value of human driving force.

One object of the present disclosure is to provide a human-powered vehicle control device for a human-powered vehicle that appropriately controls a shifting device in a case where an output of a motor, which is configured to apply a propulsion force to the human-powered vehicle, decreases.

A human-powered vehicle control device in accordance with a first aspect of the present disclosure is for a human-powered vehicle. The human-powered vehicle includes a motor that applies a propulsion force to the human-powered vehicle and a shifting device that is provided in a transmission path of a human driving force and configured to change a transmission ratio. The human-powered vehicle control device comprises an electronic controller configured to control the shifting device to change the transmission ratio in accordance with a comparison of a first parameter related to the human-powered vehicle and a predetermined threshold value. The electronic controller is configured to change the predetermined threshold value in a case where an output of the motor decreases as a vehicle speed of the human-powered vehicle increases. The human-powered vehicle control device according to the first aspect appropriately controls the shifting device by changing the predetermined threshold value in a case where the output of the motor decreases as the vehicle speed of the human-powered vehicle increases.

In accordance with a second aspect of the present disclosure, the human-powered vehicle control device according to the first aspect is configured so that the case where the output of the motor decreases includes a case where the motor is stopped. The human-powered vehicle control device according to the second aspect appropriately sets the predetermined threshold value for each of a case where a propulsion force is applied by the motor and a case where a propulsion force is not applied by the motor.

In accordance with a third aspect of the present disclosure, the human-powered vehicle control device according to the first or second aspect is configured so that the predetermined threshold value includes a predetermined first threshold value. The electronic controller is configured to control the shifting device to decrease the transmission ratio in a case where the first parameter is less than the predetermined first threshold value and increase the predetermined first threshold value in a case where the output of the motor decreases as the vehicle speed of the human-powered vehicle increases. In a case where the vehicle speed of the human-powered vehicle increases and the output of the motor decreases, the human-powered vehicle control device according to the third aspect increases the predetermined first threshold value so that the transmission ratio is easily decreased. This limits increases in the load on the rider.

In accordance with a fourth aspect of the present disclosure, the human-powered vehicle control device according to any one of the first to third aspects is configured so that the predetermined threshold value includes a predetermined second threshold value. The electronic controller is configured to control the shifting device to increase the transmission ratio in a case where the first parameter is greater than the predetermined second threshold value and increase the predetermined second threshold value in a case where the output of the motor decreases as the vehicle speed of the human-powered vehicle increases. In a case where the output of the motor decreases as the vehicle speed of the human-powered vehicle increases, the human-powered vehicle control device according to the fourth aspect increases the predetermined second threshold value so that the transmission ratio is not easily increased. This limits increases in the load on the rider.

In accordance with a fifth aspect of the present disclosure, the human-powered vehicle control device according to the third or fourth aspect is configured so that the first parameter is related to at least one of a rotational speed of a crank of the human-powered vehicle and the vehicle speed of the human-powered vehicle. The human-powered vehicle control device according to the fifth aspect appropriately changes the transmission ratio in accordance with at least one of the rotational speed of the crank and the vehicle speed of the human-powered vehicle.

In accordance with a sixth aspect of the present disclosure, the human-powered vehicle control device according to the first or second aspect is configured so that the predetermined threshold value includes a predetermined first threshold value. The electronic controller is configured to control the shifting device to increase the transmission ratio in a case where the first parameter is less than the predetermined first threshold value and decrease the predetermined first threshold value in a case where the output of the motor decreases as the vehicle speed of the human-powered vehicle increases. In a case where the vehicle speed of the human-powered vehicle increases and the output of the motor decreases, the human-powered vehicle control device according to the sixth aspect decreases the predetermined first threshold value so that the transmission ratio is not easily increased. This limits increases in the load on the rider.

In accordance with a seventh aspect of the present disclosure, the human-powered vehicle control device according to any one of the first, second, and sixth aspects is configured so that the predetermined threshold value includes a predetermined second threshold value. The electronic controller is configured to control the shifting device to decrease the transmission ratio in a case where the first parameter is greater than the predetermined second threshold value and decrease the predetermined second threshold value in a case where the output of the motor decreases as the vehicle speed of the human-powered vehicle increases. In a case where the vehicle speed of the human-powered vehicle increases and the output of the motor decreases, the human-powered vehicle control device according to the seventh aspect decreases the predetermined second threshold value so that the transmission ratio is easily decreased. This limits increases in the load on the rider.

In accordance with an eighth aspect of the present disclosure, the human-powered vehicle control device according to the sixth or seventh aspect is configured so that the first parameter is related to at least one of human driving force input to the human-powered vehicle, an inclination angle of the human-powered vehicle, and an inclination angle of a traveling road of the human-powered vehicle. The human-powered vehicle control device according to the eighth aspect appropriately changes the transmission ratio in accordance with at least one of the human driving force input to the human-powered vehicle, the inclination angle of the human-powered vehicle, and the inclination angle of the traveling road of the human-powered vehicle.

In accordance with a ninth aspect of the present disclosure, the human-powered vehicle control device according to any one of the first to eighth aspects is configured so that the electronic controller is configured not to change the predetermined threshold value even if the output of the motor decreases as the vehicle speed of the human-powered vehicle increases in a case where a second parameter related to a traveling resistance of the human-powered vehicle is less than a predetermined third threshold value. The human-powered vehicle control device according to the ninth aspect is configured to change or not to change the predetermined threshold value in accordance with the second parameter related to the traveling resistance of the human-powered vehicle. Thus, the transmission ratio is appropriately changed in accordance with the traveling state of the human-powered vehicle.

In accordance with a tenth aspect of the present disclosure, the human-powered vehicle control device according to any one of the first to eighth aspects is configured so that the electronic controller is configured to vary a change amount of the predetermined threshold value in accordance with a second parameter related to a traveling resistance of the human-powered vehicle the electronic controller changes the predetermined threshold value. The human-powered vehicle control device according to the tenth aspect sets the predetermined threshold value to an appropriate value in accordance with the second parameter related to the traveling resistance.

In accordance with an eleventh aspect of the present disclosure, the human-powered vehicle control device according to the ninth aspect is configured so that the electronic controller is configured to vary a change amount of the predetermined threshold value in accordance with the second parameter the electronic controller changes the predetermined threshold value. The human-powered vehicle control device according to the eleventh aspect sets the predetermined threshold value to an appropriate value in accordance with the second parameter related to the traveling resistance.

In accordance with a twelfth aspect of the present disclosure, the human-powered vehicle control device according to the tenth or eleventh aspect is configured so that where the electronic controller changes the predetermined threshold value, the electronic controller is configured to set a smaller change amount for the predetermined threshold value in a case where the second parameter is less than a predetermined third threshold value as compared to a case where the second parameter is greater than or equal to the predetermined third threshold value. With the human-powered vehicle control device according to the twelfth aspect, in a case where the second parameter is less than the predetermined third threshold value, a greater load is applied to the rider in accordance with increases in the vehicle speed of the human-powered vehicle than in a case where the second parameter is greater than or equal to the predetermined third threshold value. Thus, the predetermined threshold value is appropriately set in accordance with the load on the rider.

In accordance with a thirteenth aspect of the present disclosure, the human-powered vehicle control device according to any one of the first to twelfth aspects is configured so that the electronic controller is configured not to change the predetermined threshold value even if the output of the motor decreases as the vehicle speed of the human-powered vehicle increases in a case where the human-powered vehicle is traveling downhill. The human-powered vehicle control device according to the thirteenth aspect limits increases in the load on the rider and reduces unnecessary shifting in a case where the human-powered vehicle is traveling downhill.

In accordance with a fourteenth aspect of the present disclosure, the human-powered vehicle control device according to any one of the first to thirteenth aspects is configured so that in a case the electronic controller is configured to change the predetermined threshold value in steps where the electronic controller changes the predetermined threshold value. The human-powered vehicle control device according to the fourteenth aspect changes the predetermined threshold value in steps. Thus, the shifting is appropriately performed in accordance with the traveling state of the human-powered vehicle.

In accordance with a fifteenth aspect of the present disclosure, the human-powered vehicle control device according to any one of the first to fourteenth aspects is configured so that the electronic controller is configured to change the predetermined threshold value so that a change amount of the predetermined threshold value in a predetermined period is less than or equal to a predetermined change amount where the electronic controller changes the predetermined threshold value. The human-powered vehicle control device according to the fifteenth aspect limits steep changes in the predetermined threshold value. Thus, the shifting is appropriately performed in accordance with the traveling state of the human-powered vehicle.

In accordance with a sixteenth aspect of the present disclosure, the human-powered vehicle control device according to any one of the first to fifteenth aspects is configured so that the electronic controller is configured to control the motor in a first control state and a second control state that differ from each other in output characteristic of the motor with respect to human driving force input to the human-powered vehicle. The electronic controller is configured to set a change amount of the predetermined threshold value differently for a case where the electronic controller changes the predetermined threshold value in the first control state and a case where the electronic controller changes the predetermined threshold value in the second control state. The human-powered vehicle control device according to the sixteenth aspect appropriately sets the predetermined threshold value for each of the first control state and the second control state.

In accordance with a seventeenth aspect of the present disclosure, the human-powered vehicle control device according to any one of the first to sixteenth aspects is configured so that the electronic controller is configured to control the motor in accordance with a human driving force input to the human-powered vehicle. With the human-powered vehicle control device according to the seventeenth aspect, the load on the rider is reduced by the motor.

In accordance with an eighteenth aspect of the present disclosure, the human-powered vehicle control device according to the sixteenth aspect is configured so that the electronic controller is configured to control the motor in accordance with a human driving force input to the human-powered vehicle and switch between the first control state and the second control state in accordance with an input from an operation device. The human-powered vehicle control device according to the eighteenth aspect allows the user to intentionally switch between the first control state and the second control state.

The human-powered vehicle control device for a human-powered vehicle according to the present disclosure appropriately controls the shifting device in a case where an output of the motor configured to apply a propulsion force to the human-powered vehicle decreases.

BRIEF DESCRIPTION OF THE DRAWINGS

Referring now to the attached drawings which form a part of this original disclosure.

DETAILED DESCRIPTION OF EMBODIMENTS

Figure 1:
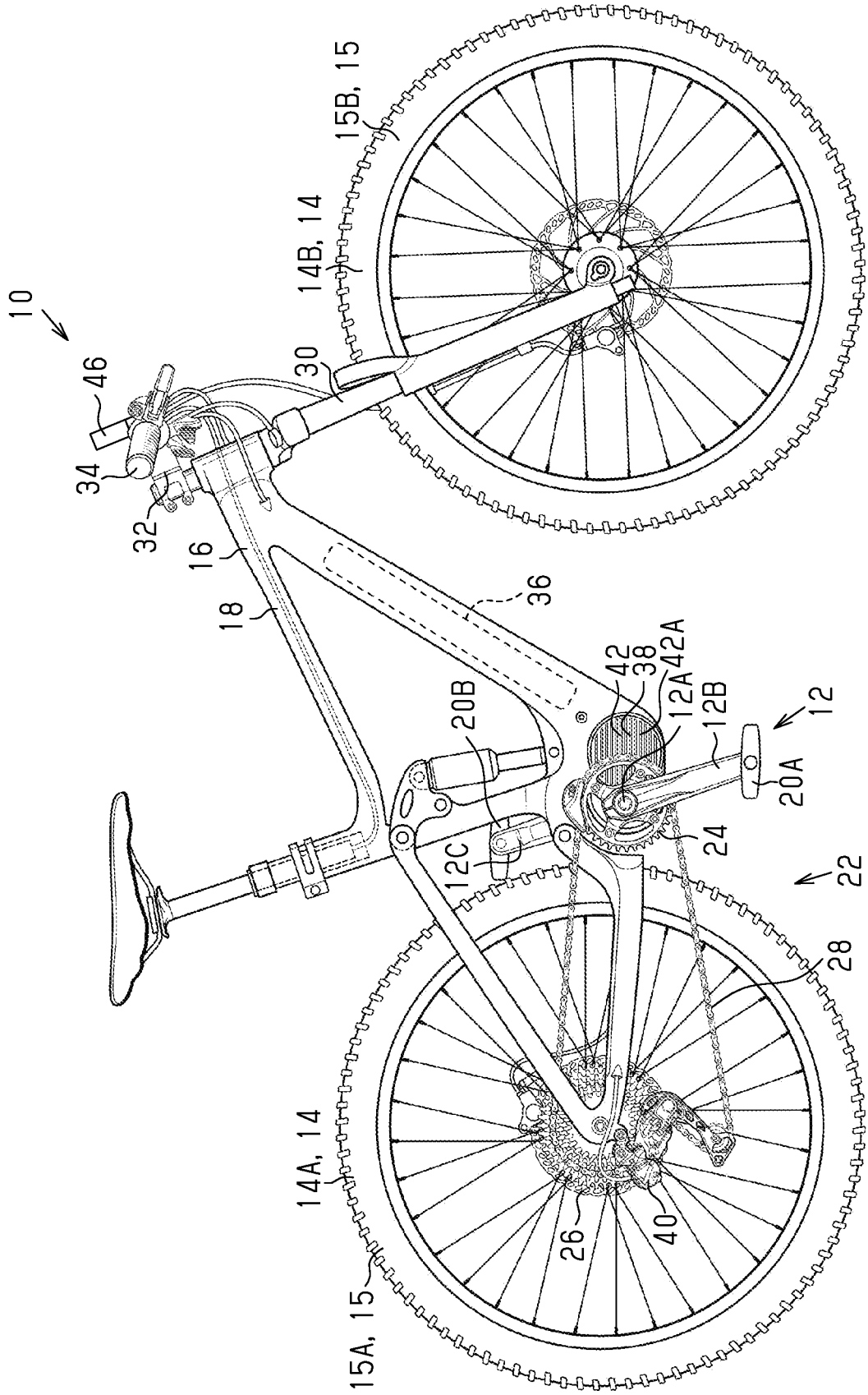
FIG. 1 is a side elevational view of a human-powered vehicle (e.g., a bicycle) including a first embodiment of a human-powered vehicle control device for the human-powered vehicle.
Figure 2:
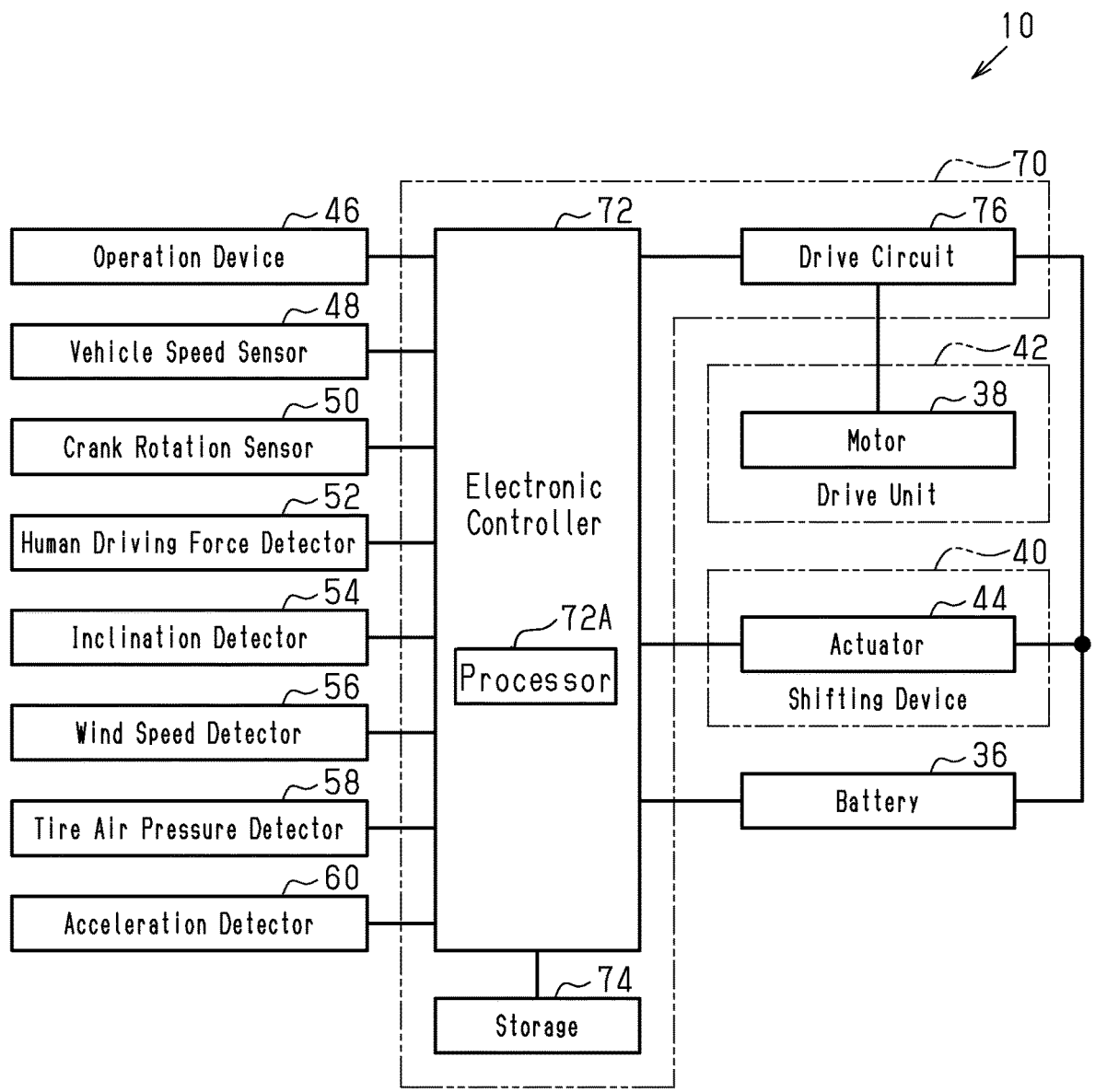
FIG. 2 is a block diagram showing the electrical configuration of the human-powered vehicle including the human-powered vehicle control device of the first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle control device 70 for a human-powered vehicle will now be described with reference to FIGS. 1 to 5. A human-powered vehicle 10 is a vehicle including at least one wheel and driven by at least a human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a vehicle including three or more wheels. The human-powered vehicle 10 is not limited to a vehicle configured to be driven only by the human driving force H. The human-powered vehicle 10 includes an E-bike that uses driving force of an electric motor in addition to the human driving force H for propulsion. The E-bike includes an electric assist bicycle that assists in propulsion with an electric motor. In the embodiments described below, the human-powered vehicle 10 refers to an electric assist bicycle.

The human-powered vehicle 10 includes a crank 12 into which the human driving force H is input. The human-powered vehicle 10 further includes wheels 14 and a vehicle body 16. The wheels 14 include a rear wheel 14A and a front wheel 14B. The vehicle body 16 includes a frame 18. The crank 12 includes an input rotational shaft 12A rotatable relative to the frame 18, a first crank arm 12B provided on a first axial end of the input rotational shaft 12A, and a second crank arm 12C provided on a second axial end of the input rotational shaft 12A. In the present embodiment, the input rotational shaft 12A is a crank axle. A first pedal 20A is coupled to the first crank arm 12B. A second pedal 20B is coupled to the second crank arm 12C. The rear wheel 14A is driven in accordance with rotation of the crank 12. The rear wheel 14A is supported by the frame 18. The crank 12 and the rear wheel 14A are coupled by a drive mechanism 22. The drive mechanism 22 includes a first rotary body 24 coupled to the input rotational shaft 12A. The input rotational shaft 12A and the first rotary body 24 can be coupled so as to rotate integrally with each other or can be coupled via a first one-way clutch. The first one-way clutch is configured to rotate the first rotary body 24 forward in a case where the crank 12 rotates forward and allow the first rotary body 24 to rotate relative to the crank 12 in a case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in a case where the second rotary body 26 rotates forward and allow the rear wheel 14A to rotate relative to the second rotary body 26 in a case where the second rotary body 26 rotates rearward.

The front wheel 14B is attached to the frame 18 via a front fork 30. A handlebar 34 is coupled to the front fork 30 via a stem 32. In the present embodiment, the rear wheel 14A is coupled to the crank 12 by the drive mechanism 22. However, any one of the rear wheel 14A and the front wheel 14B can be coupled to the crank 12 by the drive mechanism 22.

Preferably, the human-powered vehicle 10 further includes a battery 36. The battery 36 includes one or more battery elements. The battery elements include a rechargeable battery. The battery 36 is configured to supply electric power to the human-powered vehicle control device 70. Preferably, the battery 36 is connected to an electronic controller 72 of the human-powered vehicle control device 70 to communicate with the electronic controller 72 by a communication cable or a wireless communication device. The battery 36 is configured to communicate with the electronic controller 72 through, for example, power line communication (PLC), a controller area network (CAN), or a universal asynchronous receiver/transmitter (UART).

The human-powered vehicle 10 includes a motor 38 and a shifting device 40. The motor 38 is configured to apply a propulsion force to the human-powered vehicle 10. Thus, the motor 38 constitutes an assist motor. The motor 38 includes one or more electric motors. The motor 38 is configured to transmit rotation to at least one of the front wheel 14B and a power transmission path of the human driving force H extending from the pedals 20A and 20B to the rear wheel 14A. The power transmission path of the human driving force H extending from the pedals 20A and 20B to the rear wheel 14A includes the rear wheel 14A. In the present embodiment, the motor 38 is provided on the frame 18 of the human-powered vehicle 10, and is configured to transmit rotation to the first rotary body 24. The motor 38 is provided on a housing 42A. The housing 42A is provided on the frame 18. The housing 42A is, for example, detachably attached to the frame 18. Preferably, the housing 42A rotatably supports the input rotational shaft 12A. A drive unit 42 is configured to include the motor 38 and the housing 42A on which the motor 38 is provided. Preferably, a third one-way clutch is provided on the power transmission path between the motor 38 and the input rotational shaft 12A so that in a case where the input rotational shaft 12A is rotated in a direction in which the human-powered vehicle 10 travels forward, the rotational force of the crank 12 will not be transmitted to the motor 38. In a case where the motor 38 is provided on at least one of the rear wheel 14A and the front wheel 14B, the motor 38 can include a hub motor. Preferably, the drive unit 42 further includes a speed reducer provided in the power transmission path between the motor 38 and the first rotary body 24.

The shifting device 40 is provided in a transmission path of human driving force H and configured to change a transmission ratio R. The shifting device 40 includes multiple shift stages. Each shift stage corresponds to a different transmission ratio R. The number of shift stages is included in a range, for example, from three to thirty. The transmission ratio R is a ratio of rotational speed of a driving wheel to rotational speed NC of the crank 12. In the present embodiment, the driving wheel is the rear wheel 14A. The shifting device 40 includes, for example, at least one of a front derailleur, a rear derailleur, and an internal shifting device. In a case where the shifting device 40 includes an internal shifting device, the internal shifting device is provided, for example, on a hub of the rear wheel 14A. The shifting device 40 includes an electric shifting device configured to be actuated by an actuator 44. In a case where the shifting device 40 includes a front derailleur, the shifting device 40 includes the first rotary body 24, and the first rotary body 24 includes multiple front sprockets. In a case where the shifting device 40 includes a rear derailleur, the shifting device 40 includes the second rotary body 26, and the second rotary body 26 includes multiple rear sprockets. The actuator 44 includes an electric actuator. The actuator 44 includes, for example, an electric motor. The relation of the transmission ratio R, rotational speed NW of the driving wheel, and the rotational speed NC of the crank 12 is expressed by Equation 1.

$$\text{Transmission Ratio } R = \text{Rotational Speed } NW/\text{Rotational Speed } NC \qquad \text{Equation 1}$$

Each of the rotational speed NW of the driving wheel and the rotational speed NC of the crank 12 can be the number of rotations per unit time. The rotational speed NW of the driving wheel is interchangeable with the number of teeth on a front sprocket, and the rotational speed NC of the crank 12 is interchangeable with the number of teeth on a rear sprocket. Preferably, the human-powered vehicle 10 further includes an operation device 46. The operation device 46 is configured to be operable, for example, by a hand or a finger of a user. The operation device 46 is provided, for example, on the handlebar 34. The operation device 46 includes, for example, a cycle computer, a portable information communication device, or a smartphone. The operation device 46 is connected to the human-powered vehicle control device 70 via an electric cable or a wireless communication device to communicate with the human-powered vehicle control device 70.

The human-powered vehicle control device 70 includes the electronic controller 72. The electronic controller 72 includes one or more processors 72A such as an arithmetic processing unit that executes a predetermined control program. The processor 72A includes, for example, a central processing unit (CPU) or a micro processing unit (MPU). The processors can be provided at positions separate from each other. The electronic controller 72 can include one or more microcomputers. Preferably, the human-powered vehicle control device 70 further includes storage 74. The storage 74 stores various control programs and information used for various control processes. The storage 74 includes any computer storage device or any non-transitory computer-readable medium with the sole exception of a transitory, propagating signal. For example, the storage 84 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Preferably, the human-powered vehicle control device 70 further includes a drive circuit 76 of the motor 38. Preferably, the drive circuit 76 and the electronic controller 72 are provided on the housing 42A of the drive unit 42. The drive circuit 76 and the electronic controller 72 can be provided, for example, on the same circuit substrate. The drive circuit 76 includes an inverter circuit. The drive circuit 76 controls electric power supplied from the battery 36 to the motor 38. The drive circuit 76 is connected to the electronic controller 72 to communicate with the electronic controller 72 via an electric cable or a wireless communication device. The drive circuit 76 drives the motor 38 in accordance with a control signal from the electronic controller 72.

Preferably, the human-powered vehicle 10 further includes a vehicle speed sensor 48. Preferably, the human-powered vehicle 10 further includes at least one of a crank rotation sensor 50, a human driving force detector 52, an inclination detector 54, a wind speed detector 56, a tire air pressure detector 58, and an acceleration detector 60. The terms "sensor" and as "detector" used herein refers to a hardware device or instrument designed to detect the presence or absence of a particular event, object, substance, or a change in its environment, and to emit a signal in response. The terms "sensor" and as "detector" as used herein does not include a human.

The vehicle speed sensor 48 is configured to detect information corresponding to the rotational speed NW of the wheels 14 of the human-powered vehicle 10. The vehicle speed sensor 48 is configured to detect, for example, a magnet provided on a wheel 14 of the human-powered vehicle 10. The vehicle speed sensor 48 is configured to, for example, output a detection signal a predetermined number of times in one rotation of the wheel 14. The predetermined number of times is, for example, one. The vehicle speed sensor 48 outputs a signal corresponding to the rotational speed NW of the wheel 14. The electronic controller 72 calculates vehicle speed V of the human-powered vehicle 10 based on information corresponding to the rotational speed NW of the wheel 14 and information related to the perimeter of the wheel 14. The storage 74 stores the information related to the perimeter of the wheel 14.

The vehicle speed sensor 48 includes, for example, a magnetic reed forming a reed switch or a magnetic sensor such as a Hall element. The vehicle speed sensor 48 can be attached to a chainstay of the frame 18 of the human-powered vehicle 10 and configured to detect a magnet attached to the rear wheel 14A, or can be provided on the front fork 30 and configured to detect a magnet attached to the front wheel 14B. In the present embodiment, the vehicle speed sensor 48 is configured so that the reed switch detects the magnet once in one rotation of the wheel 14. The vehicle speed sensor 48 can have any configuration that detects information related to the vehicle speed of the human-powered vehicle 10. The vehicle speed sensor 48 is not limited to the configuration that detects the magnet provided on the wheel 14 and can be configured to detect, for example, a slit provided in a disc brake rotor. The vehicle speed sensor 48 can include an optical sensor instead of a magnetic sensor. The vehicle speed sensor 48 can include a global positioning system (GPS) receiver. In a case where the vehicle speed sensor 48 includes a GPS receiver, the electronic controller 72 can calculate the vehicle speed V based on time and a travelled distance. The vehicle speed sensor 48 is connected to the electronic controller 72 via a wireless communication device or an electric cable.

The crank rotation sensor 50 is configured to detect information corresponding to the rotational speed NC of the crank 12. The crank rotation sensor 50 is provided, for example, on the frame 18 of the human-powered vehicle 10 or the drive unit 42. The crank rotation sensor 50 is configured to include a magnetic sensor that outputs a signal corresponding to the strength of the magnetic field. An annular magnet having a magnetic field, the strength of which changes in the circumferential direction, is provided on the input rotational shaft 12A, a member that rotates in cooperation with the input rotational shaft 12A, or a power transmission path extending between the input rotational shaft 12A and the first rotary body 24. The member that rotates in cooperation with the input rotational shaft 12A can include an output shaft of the motor 38.

The crank rotation sensor 50 outputs a signal corresponding to the rotational speed NC of the crank 12. For example, in a case where the first one-way clutch is not provided between the input rotational shaft 12A and the first rotary body 24, the magnet can be provided on the first rotary body 24. The crank rotation sensor 50 can have any configuration that detects information related to the rotational speed NC of the crank 12. The crank rotation sensor 50 can include a magnetic sensor that is configured in the same manner as the vehicle speed sensor 48. The crank rotation sensor 50 can include, for example, an optical sensor, an acceleration sensor, a gyro sensor, or a torque sensor instead of the magnetic sensor. The crank rotational sensor 50 is connected to the electronic controller 72 via a wireless communication device or an electric cable.

The human driving force detector 52 includes, for example, a torque sensor. The torque sensor is configured to output a signal corresponding to torque applied to the crank 12 by human driving force H. For example, in a case where the first one-way clutch is provided on the power transmission path, it is preferred that the torque sensor is provided at the upstream side of the first one-way clutch in the power transmission path. The torque sensor includes, for example, a strain sensor, a magnetostrictive sensor, or a pressure sensor. The strain sensor includes a strain gauge.

The torque sensor is provided on a member included in the power transmission path or a member near the member included in the power transmission path. The member included in the power transmission path includes, for example, the input rotational shaft 12A, a member that transmits human driving force H between the input rotational shaft 12A and the first rotary body 24, the crank arms 12B and 12C, and the pedals 20A and 20B. The human driving force detector 52 is connected to the electronic controller 72 via a wireless communication device or an electric cable. The human driving force detector 52 can have any configuration that obtains information related to human driving force H and can include, for example, a sensor that detects pressure applied to the pedals 20A and 20B or a sensor that detects tension of a chain.

The inclination detector 54 is configured to detect an inclination angle D of a road surface on which the human-powered vehicle 10 is traveling. The inclination angle of the road surface on which the human-powered vehicle 10 travels can be detected by the inclination angle D in a travel direction of the human-powered vehicle 10. The inclination angle D of the road surface on which the human-powered vehicle 10 is travelling corresponds to the pitch angle of the human-powered vehicle 10. In an example, the inclination detector 54 includes an inclination sensor. The inclination sensor includes at least one of a gyro sensor and an acceleration sensor. In another example, the inclination detector 54 includes a global positioning system (GPS) receiver. The electronic controller 72 can calculate the inclination angle D of the road surface on in which the human-powered vehicle 10 is traveling based on GPS information that is obtained by the GPS receiver and information related to gradients of road surfaces included in map information stored in advance in the storage 74. The inclination detector 54 is connected to the electronic controller 72 via a wireless communication device or an electric cable.

The wind speed detector 56 is configured to detect a wind speed. The wind speed detector 56 includes at least one of a wind speed sensor and a wind pressure sensor. The wind speed detector 56 is provided, for example, on the handlebar 34 of the human-powered vehicle 10. Preferably, the wind speed detector 56 is configured to detect at least one of a headwind and a tailwind in a case where the human-powered vehicle 10 travels forward. The wind speed detector 56 is connected to the electronic controller 72 via a wireless communication device or an electric cable.

The tire air pressure detector 58 is configured to detect the air pressure of a tire 15 of the wheel 14. The tire air pressure detector 58 is configured to detect the air pressure of the inside of the tire 15. The tire air pressure detector 58 is connected to the electronic controller 72 via a wireless communication device or an electric cable. The tire air pressure detector 58 detects at least one of the air pressure of the tire 15B of the front wheel 14B and the air pressure of the tire 15A of the rear wheel 14A. Preferably, the tire air pressure detector 58 detects both the air pressure of the tire 15B of the front wheel 14B and the air pressure of the tire 15A of the rear wheel 14A.

The acceleration detector 60 is configured to detect a signal corresponding to the acceleration in a direction in which the human-powered vehicle 10 travels forward. The acceleration detector 60 can include an acceleration sensor or can include the vehicle speed sensor 48. The acceleration detector 60 is connected to the electronic controller 72 via a wireless communication device or an electric cable. In a case where the acceleration detector 60 includes the vehicle speed sensor 48, the electronic controller 72 differentiates the vehicle speed V to obtain information related to acceleration in the direction in which the human-powered vehicle 10 travels forward.

Preferably, the electronic controller 72 is configured to control the motor 38. Preferably, the electronic controller 72 is configured to control the motor 38 in accordance with the human driving force H that is input to the human-powered vehicle 10. The human driving force H can be expressed in torque or power. In a case where human driving force H is expressed in power, the human driving force H is obtained by multiplying torque that is detected by the human driving force detector 52 and the rotational speed NC of the crank 12 that is detected by the crank rotation sensor 50.

The electronic controller 72 is configured to control the motor 38, for example, so that the ratio of assist force M of the motor 38 to the human driving force H equals a predetermined ratio A. The predetermined ratio A does not have to be fixed and can change, for example, in accordance with the human driving force H, the vehicle speed V, or both human driving force H and the vehicle speed V. The human driving force H and the assist force M can be expressed in torque or power. In the description, in a case where the human driving force H and the assist force M are expressed in torque, the human driving force H is referred to as the human torque HT, and the assist force M is referred to as assist torque MT. In the description, in a case where the human driving force H and the assist force M are expressed in power, the human driving force H is referred to as the human power HW, and the assist force M is referred to as the assist power MW.

In the description, the ratio of the assist torque MT to the human torque HT of the human-powered vehicle 10 can be referred to as an assist ratio AT. In the description, the ratio of the assist power MW to the human power HW can be referred to as an assist ratio AW. The electronic controller 72 is configured to output a control instruction to the drive circuit 76 of the motor 38 in accordance with the human torque HT or the human power HW. The control instruction includes, for example, a torque instruction value.

The electronic controller 72 is configured to control the motor 38 so that the assist force M is less than or equal to an upper limit value MX. In a case where the assist force M is expressed in torque, the electronic controller 72 is configured to control the motor 38 so that the assist torque MT is less than or equal to an upper limit value MTX. Preferably, the upper limit value MTX is in a range of 30 Nm or greater and 90 Nm or less. The upper limit value MTX is, for example, 85 Nm. The upper limit value MTX is specified, for example, by an output characteristic of the motor 38. In a case where the assist force M is expressed in power, the electronic controller 72 is configured to control the motor 38 so that the assist power MW is less than or equal to an upper limit value MWX.

The electronic controller 72 can be configured to control the motor 38 in accordance with the rotational speed NC of the crank 12 in addition to human driving force H. For example, in a case where the rotational speed NC of the input rotational shaft 12A is less than a predetermined rotational speed NCX, the electronic controller 72 stops driving the motor 38 in accordance with at least one of the rotational speed NC of the crank 12 and human driving force H. The predetermined rotational speed NCX has, for example, a value in a range of 0 rpm or greater and 5 rpm or less.

For example, in a case where the vehicle speed V becomes greater than or equal to a first vehicle speed V1, the electronic controller 72 stops the motor 38. The first vehicle speed V1 is, for example, 25 km per hour. The first vehicle speed V1 can be less than 25 km per hour and can be, for example, 24 km per hour. The first vehicle speed V1 can be greater than 25 km per hour and can be, for example, 45 km per hour. Preferably, the electronic controller 72 is configured to control the motor 38 so that at least one of the upper limit value MX and the ratio A decreases as the vehicle speed V increases in a range from a second vehicle speed V2 that is lower than the first vehicle speed V1 to the first vehicle speed V1.

The electronic controller 72 is configured to control the shifting device 40. The electronic controller 72 is configured to control the shifting device 40 to change the transmission ratio R in accordance with a comparison of a first parameter P1 related to the human-powered vehicle 10 and a predetermined threshold value P1X. In a case where an output of the motor 38 decreases as the vehicle speed V of the human-powered vehicle 10 increases, the electronic controller 72 is configured to change the predetermined threshold value P1X. Preferably, the predetermined threshold value P1X is stored in the storage 74 in advance. The user can set an initial value of the predetermined threshold value P1X. Preferably, in a case where the output of the motor 38 decreases as the vehicle speed V of the human-powered vehicle 10 increases, the electronic controller 72 is configured to change the predetermined threshold value P1X, which is stored in the storage 74, from the initial value of the predetermined threshold value P1X to another value.

Preferably, the case where the output of the motor 38 decreases includes a case where the motor 38 is stopped. Preferably, the case where the output of the motor 38 decreases as the vehicle speed V increases includes a case where the vehicle speed V is greater than or equal to the second vehicle speed V2 and increases. Preferably, the case where the output of the motor 38 decreases as the vehicle speed V increases includes a case where the vehicle speed V is greater than or equal to the first vehicle speed V1. Preferably, in a case where the electronic controller 72 changes the predetermined threshold value P1X, the electronic controller 72 is configured to change the predetermined threshold value P1X in steps. Preferably, in a case where the electronic controller 72 changes the predetermined threshold value P1X, the electronic controller 72 is configured to change the predetermined threshold value P1X so that a change amount of the predetermined threshold value P1X in a predetermined period is less than or equal to a predetermined change amount. In a case where the electronic controller 72 changes the predetermined threshold value P1X, the electronic controller 72 changes the predetermined threshold value P1X so as not to steeply change the predetermined threshold value P1X. The predetermined period is, for example, a period that is greater than or equal to 1 second and less than or equal to 5 seconds. In a case of the rotational speed of the crank, the predetermined change amount is in a range from 1 rpm or greater and 10 rpm or less.

The electronic controller 72 is configured to change the transmission ratio R in accordance with a comparison of the first parameter P1 and the predetermined threshold value P1X. The first parameter P1 relates to at least one of the rotational speed NC of the crank 12 and the vehicle speed V of the human-powered vehicle 10. In a case where the first parameter P1 relates to the rotational speed NC of the crank 12, the first parameter P1 is, for example, the rotational speed NC of the crank 12. In a case where the first parameter P1 relates to the vehicle speed V, the first parameter P1 is, for example, the vehicle speed V.

Preferably, the predetermined threshold value P1X includes a predetermined first threshold value P11. In a case where the first parameter P1 is less than the predetermined first threshold value P11, the electronic controller 72 controls the shifting device 40 to decrease the transmission ratio R. Preferably, the predetermined threshold value P1X includes a predetermined second threshold value P12. In a case where the first parameter P1 is greater than the predetermined second threshold value P12, the electronic controller 72 controls the shifting device 40 to increase the transmission ratio R. Preferably, the second threshold value P12 is greater than the first threshold value P11. The user can set initial values of the first threshold value P11 and the second threshold value P12. In a case where the first parameter P1 is the rotational speed NC of the crank 12, the first threshold value P11 is in a range of, for example, 30 rpm or greater and 70 rpm or less. In the case of the rotational speed of the crank, the second threshold value P12 is in a range of, for example, 55 rpm or greater and 100 rpm or less.

Figure 3:
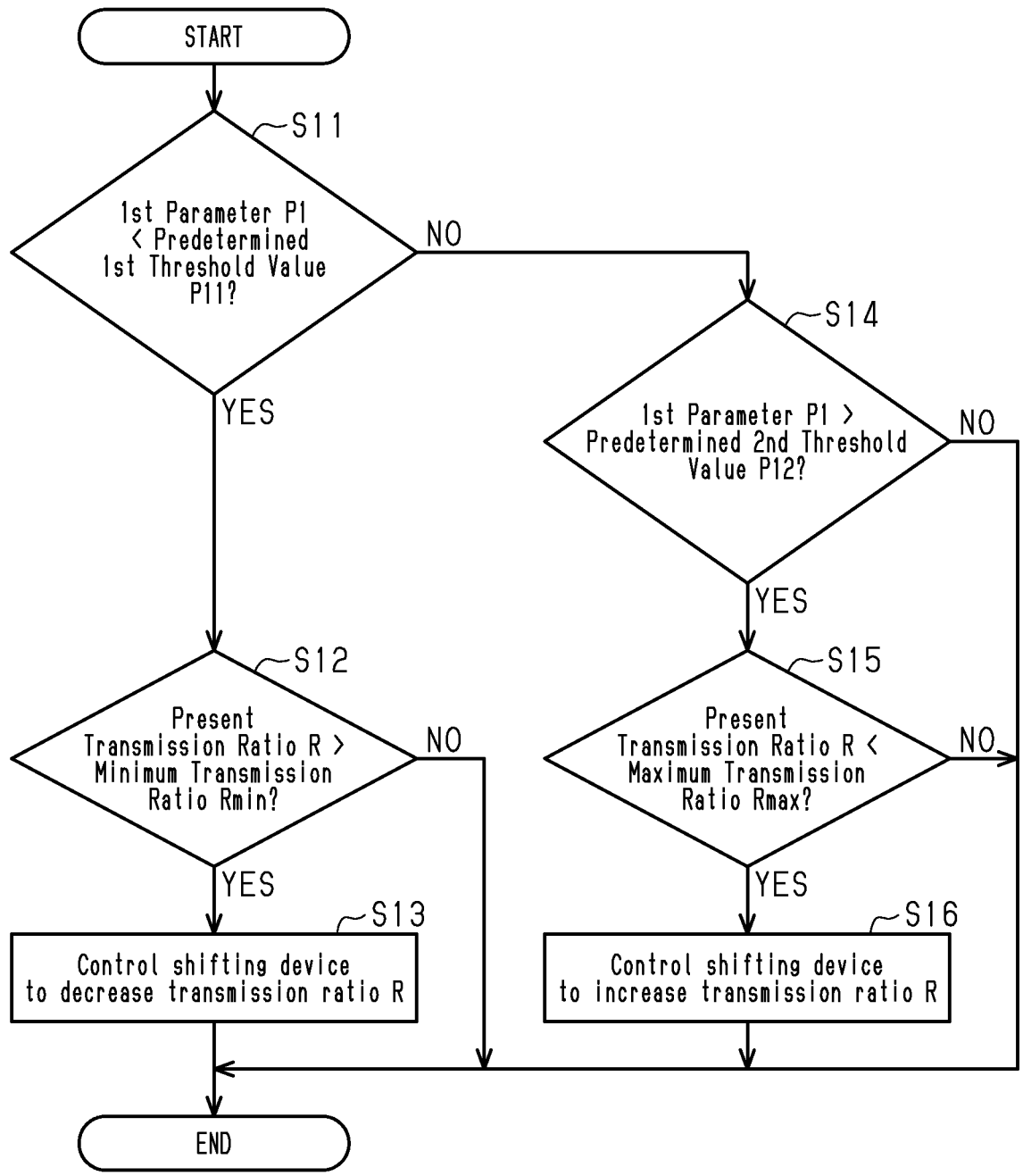
FIG. 3 is a flowchart of a process for controlling a shifting device executed by the electronic controller shown in FIG. 2.

A process for controlling the shifting device 40 will now be described with reference to FIG. 3. In a case where electric power is supplied to the electronic controller 72, the electronic controller 72 starts the process and proceeds to step S11 of the flowchart shown in FIG. 3. In a case where the flowchart shown in FIG. 3 ends, the electronic controller 72 repeats the process from step Sl1 after a predetermined interval until the supply of electric power is stopped.

In step S11, the electronic controller 72 determines whether the first parameter P1 is less than the predetermined first threshold value P11. In a case where the first parameter P1 is less than the predetermined first threshold value P11, the electronic controller 72 proceeds to step S12. In step S12, the electronic controller 72 determines whether the present transmission ratio R is greater than the minimum transmission ratio Rmin of the shifting device 40. In a case where the present transmission ratio R is less than or equal to the minimum transmission ratio Rmin, the electronic controller 72 ends the process. In a case where the transmission ratio R is greater than the minimum transmission ratio Rmin, the electronic controller 72 proceeds to step S13. In step S13, the electronic controller 72 controls the shifting device 40 to decrease the transmission ratio R and then ends the process. In step S13, the electronic controller 72 changes the shift stage by one stage.

In step S11, in a case where the first parameter P1 is greater than or equal to the predetermined first threshold value P11, the electronic controller 72 proceeds to step S14. In step S14, the electronic controller 72 determines whether the first parameter P1 is greater than the predetermined second threshold value P12. In a case where the first parameter P1 is less than or equal to the predetermined second threshold value P12, the electronic controller 72 ends the process. In a case where the first parameter P1 is greater than the predetermined second threshold value P12, the electronic controller 72 proceeds to step S15.

In step S15, the electronic controller 72 determines whether the present transmission ratio R is less than the maximum transmission ratio Rmax of the shifting device 40. In a case where the present transmission ratio R is greater than or equal to the maximum transmission ratio Rmax, the electronic controller 72 ends the process. In a case where the present transmission ratio R is less than the maximum transmission ratio Rmax, the electronic controller 72 proceeds to step S16. In step S16, the electronic controller 72 controls the shifting device 40 to increase the transmission ratio R and then ends the process. In step S16, the electronic controller 72 changes the shift stage by one stage.

In step S12, instead of the comparison of the present transmission ratio R and the minimum transmission ratio Rmin, the electronic controller 72 can compare the present shift stage with the minimum shift stage. In a case where the present shift stage is compared with the minimum shift stage, for example, a numeral is assigned to each shift stage, and the numeral corresponding to the present shift stage is compared with the numeral corresponding to the minimum shift stage. The numeral corresponding to the minimum shift stage is, for example, 1.

In step S15, instead of comparing the present transmission ratio R and the maximum transmission ratio Rmax, the electronic controller 72 can compare the present shift stage and the maximum shift stage. In a case where the present shift stage is compared with the maximum shift stage, for example, a numeral is assigned to each shift stage, and the numeral corresponding to the present shift stage is compared with the numeral corresponding to the maximum shift stage.

Preferably, in a case where the output of the motor 38 decreases as the vehicle speed V of the human-powered vehicle 10 increases, the electronic controller 72 is configured to increase the predetermined first threshold value P11. Preferably, in a case where the output of the motor 38 decreases as the vehicle speed V of the human-powered vehicle 10 increases, the electronic controller 72 is configured to increase the predetermined second threshold value P12. In a case where the first parameter P1 is the rotational speed NC of the crank 12, for example, the predetermined threshold value P1X can be changed in a range from 1 rpm to 5 rpm whenever the vehicle speed increases in a range from 1 km/h to 5 km/h.

Preferably, the electronic controller 72 is configured to set the predetermined threshold value P1X in accordance with a second parameter P2 related to a traveling resistance X of the human-powered vehicle 10. Preferably, the second parameter P2 related to the traveling resistance X of the human-powered vehicle 10 is a parameter that increases as the traveling resistance X increases. The second parameter P2 related to the traveling resistance X of the human-powered vehicle 10 is, for example, the traveling resistance X. The traveling resistance X includes at least one of inclination resistance, air resistance, rolling resistance of the tire 15, and acceleration resistance. The inclination resistance increases as the inclination angle D increases. The rolling resistance of the tire 15 increases as the air pressure of the tire 15 decreases. The air resistance increases as the speed of wind from the downstream side in the travel direction of the human-powered vehicle 10 increases. The acceleration resistance increases as the acceleration in the travel direction of the human-powered vehicle 10 increases.

The electronic controller 72 sets the predetermined threshold value P1X in accordance with at least one of the inclination angle D detected by the inclination detector 54, the wind speed detected by the wind speed detector 56, the air pressure of the tire 15 detected by the tire air pressure detector 58, and the acceleration detected by the acceleration detector 60. Preferably, information related to the relationship between the second parameter P2 and the change amount of the predetermined threshold value P1X is stored in the storage 74 in advance. The information related to the relationship between the second parameter P2 and the change amount of the predetermined threshold value P1X includes at least one of a table, a map, and a relational expression.

Preferably, the electronic controller 72 is configured not to change the predetermined threshold value P1X even if the output of the motor 38 decreases as the vehicle speed V of the human-powered vehicle 10 increases in a case where the second parameter P2 related to the traveling resistance X of the human-powered vehicle 10 is less than a predetermined third threshold value P2X.

Preferably, in a case where the electronic controller 72 changes the predetermined threshold value P1X, the electronic controller 72 is configured to set a smaller change amount for the predetermined threshold value P1X in a case where the second parameter P2 is less than the predetermined third threshold value P2X than in a case where the second parameter P2 is greater than or equal to the predetermined third threshold value P2X.

Preferably, in a case where the electronic controller 72 changes the predetermined threshold value P1X, the electronic controller 72 is configured to vary the change amount of the predetermined threshold value P1X in accordance with the second parameter P2 related to the traveling resistance X of the human-powered vehicle 10.

Preferably, the electronic controller 72 is configured not to change the predetermined threshold value P1X even if the output of the motor 38 decreases as the vehicle speed V of the human-powered vehicle 10 increases in a case where the human-powered vehicle 10 is travelling downhill.

A process for controlling the predetermined threshold value P1X will now be described with reference to FIG. 4. In a case where electric power is supplied to the electronic controller 72, the electronic controller 72 starts the process and proceeds to step S31 of the flowchart shown in FIG. 4. In a case where the flowchart shown in FIG. 4 ends, the electronic controller 72 repeats the process from step S31 after a predetermined interval until the supply of electric power stops.

In step S31, the electronic controller 72 determines whether the output of the motor 38 has decreased in accordance with an increase in the vehicle speed V. For example, in a case where the vehicle speed V is greater than or equal to the first vehicle speed V1 and the motor 38 has stopped, the electronic controller 72 determines that the output of the motor 38 has decreased in accordance with an increase in the vehicle speed V. In a case where the output of the motor 38 has not decreased in accordance with an increase in the vehicle speed V, the electronic controller 72 ends the process. In a case where the output of the motor 38 has decreased in accordance with an increase in the vehicle speed V, the electronic controller 72 proceeds to step S32.

In step S32, the electronic controller 72 determines whether the human-powered vehicle 10 is traveling downhill. In a case where the human-powered vehicle 10 is traveling downhill, the electronic controller 72 ends the process. In a case where the human-powered vehicle 10 is not traveling downhill, the electronic controller 72 proceeds to step S33.

In step S33, the electronic controller 72 determines whether the second parameter P2 is less than the third threshold value P2X. In a case where the second parameter P2 is greater than or equal to the third threshold value P2X, the electronic controller 72 proceeds to step S34. In step S34, the electronic controller 72 changes the predetermined first threshold value P11 to a first value P1A, changes the predetermined second threshold value P12 to a second value P1B, and then ends the process.

In step S33, in a case where the second parameter P2 is less than the third threshold value P2X, the electronic controller 72 proceeds to step S35. In step S35, the electronic controller 72 changes the predetermined first threshold value P11 to a third value P1C, changes the predetermined second threshold value P12 to a fourth value P1D, and then ends the process.

The first value P1A and the third value P1C are greater than the initial value of the predetermined first threshold value P11 stored in the storage 74. The second value P1B and the fourth value P1D are greater than the initial value of the predetermined second threshold value P12 stored in the storage 74. Preferably, the third value P1C is less than the first value P1A. Preferably, the fourth value P1D is less than the second value P1B.

Preferably, in a case where the output of the motor 38 decreases as the vehicle speed V increases, if the predetermined threshold value P1X is changed and a predetermined condition is satisfied, the electronic controller 72 changes the changed predetermined threshold value P1X back to a previous predetermined threshold value P1X. For example, in a case where the predetermined condition is satisfied, the electronic controller 72 changes the predetermined threshold value P1X to the initial value of the predetermined threshold value P1X stored in the storage 74. The predetermined condition includes, for example, at least one of a case where the vehicle speed V has decreased, a case where the vehicle speed V is less than the first vehicle speed V1, and the vehicle speed V is less than the second vehicle speed V2.

Preferably, the electronic controller 72 is configured to control the motor 38 in a first control state and a second control state that differ from each other in output characteristic of the motor 38 with respect to human driving force H input to the human-powered vehicle 10. The electronic controller 72 is configured to control the motor 38, for example, in a control state selected from control states that at least partially differ from each other in the correspondence relationship between human driving force H and the predetermined ratio A. The control states include the first control state and the second control state. The control states can include at least one further control state other than the first control state and the second control state. The control states can include a control state in which the motor 38 is not driven.

Preferably, the electronic controller 72 is configured to switch between the first control state and the second control state in accordance with an input from the operation device 46. In a case where the user performs an operation on the operation device 46 for switching the control state, the operation device 46 transmits a signal related to a switching request of the control state to the electronic controller 72. In a case where the electronic controller 72 receives the signal related to the switching request of the control state from the operation device 46, for example, the electronic controller 72 switches to the second control state if the control state is the first control state, and switches to the first control state if the control state is the second control state. In a case where the electronic controller 72 receives the signal related to the switching request of the control state from the operation device 46, the electronic controller 72 can switch between the control states in accordance with the number of times the switching request of the control state is received form the operation device 46.

The operation device 46 can have any configuration that switches between the first control state and the second control state. The operation device 46 can transmit a signal related to a switching request for switching to the first control state. In a case where the electronic controller 72 receives the signal related to the switching request for switching to the first control state, if the control state is the second control state or the at least one further control state, the electronic controller 72 switches to the first control state. The operation device 46 can transmit a signal related to a switching request for switching to the second control state. In a case where the electronic controller 72 receives the signal related to the switching request for switching to the second control state, if the control state is the first control state or the at least one further control state, the electronic controller 72 switches to the second control state.

Figure 5:
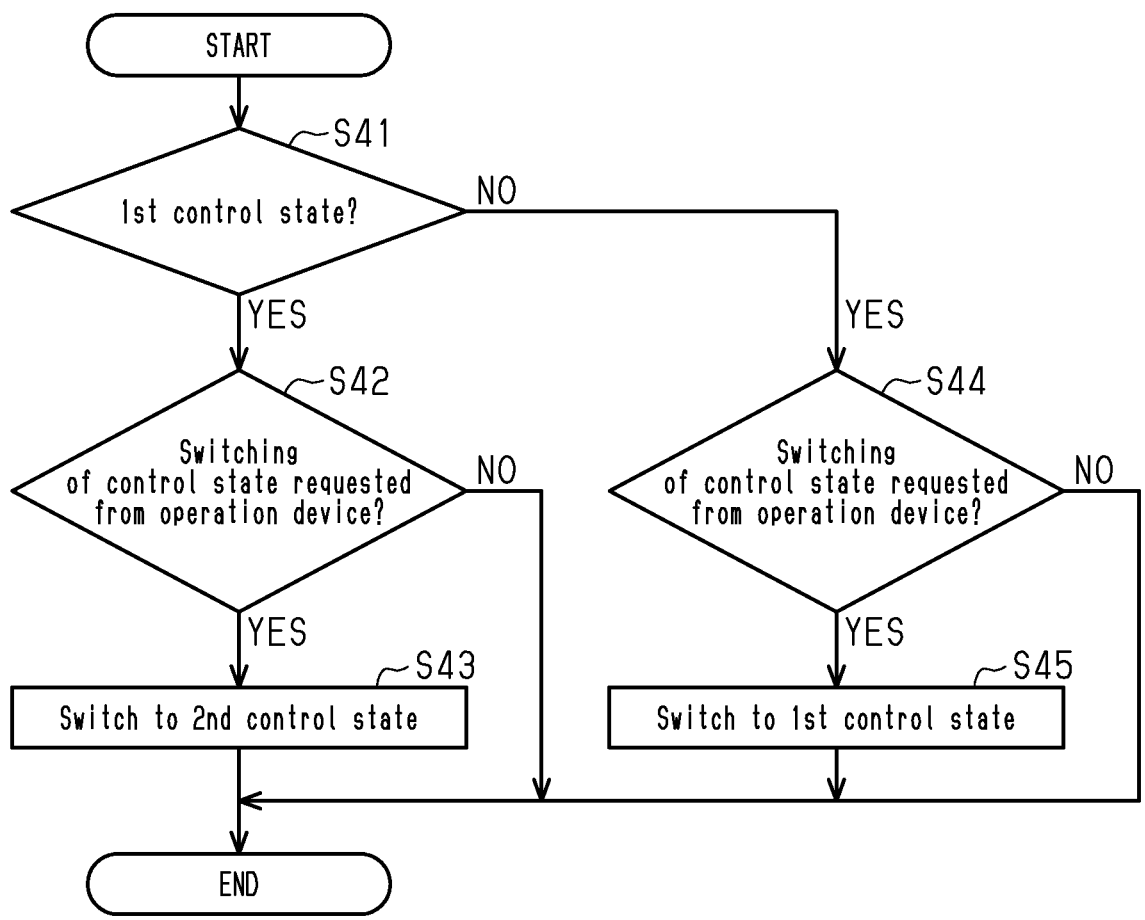
FIG. 5 is a flowchart of a process for switching a control state of a motor executed by the electronic controller shown in FIG. 2.

A process for switching the control state will now be described with reference to FIG. 5. In a case where electric power is supplied to the electronic controller 72, the electronic controller 72 starts the process and proceeds to step S41 of the flowchart shown in FIG. 5. In a case where the flowchart shown in FIG. 5 ends, the electronic controller 72 repeats the process from step S41 after a predetermined interval until the supply of electric power stops.

In step S41, the electronic controller 72 determines whether the control state is the first control state. In a case where the control state is the first control state, the electronic controller 72 proceeds to step S42. In step S42, the electronic controller 72 determines whether the switching of the control state is requested from the operation device 46. In a case where the switching of the control state is not requested from the operation device 46, the electronic controller 72 ends the process. In a case where the switching of the control state is requested from the operation device 46, the electronic controller 72 proceeds to step S43. In step S43, the electronic controller 72 switches to the second control state and then ends the process.

In step S41, in a case where the control state is not the first control state, the electronic controller 72 proceeds to step S44. In step S44, the electronic controller 72 determines whether the switching of the control state is requested from the operation device 46. In a case where the switching of the control state is not requested from the operation device 46, the electronic controller 72 ends the process. In a case where the switching of the control state is requested from the operation device 46, the electronic controller 72 proceeds to step S45. In step S45, the electronic controller 72 switches to the first control state and then ends the process.

Preferably, the electronic controller 72 is configured to set a change amount of the predetermined threshold value P1X differently for a case where the electronic controller 72 changes the predetermined threshold value P1X in the first control state and a case where the electronic controller 72 changes the predetermined threshold value P1X in the second control state. For example, in a case where the maximum value of the predetermined ratio A in the first control state is less than the maximum value of the predetermined ratio A in the second control state, the change amount of the predetermined threshold value P1X changed by the process of steps S34 and S35 shown in the flowchart of FIG. 4 in the first control state is set to be smaller than the change amount of the predetermined threshold value P1X changed by the process of steps S34 and S35 shown in the flowchart of FIG. 4 in the second control state.

Second Embodiment

A second embodiment of a human-powered vehicle control device 70 and the first embodiment of the human-powered vehicle control device 70 have the same configuration except in the process of the electronic controller 72. The differences will be described.

The first parameter P1 of the second embodiment differs from the first parameter P1 of the first embodiment. In the second embodiment, the first parameter P1 relates to at least one of human driving force H input to the human-powered vehicle 10, the inclination angle D of the human-powered vehicle 10, and the inclination angle of the traveling road of the human-powered vehicle 10. In a case where the first parameter P1 relates to human driving force H, the first parameter P1 is, for example, a human driving force H. In a case where the first parameter P1 relates to the inclination angle D of the human-powered vehicle 10, the first parameter P1 is, for example, the inclination angle D of the human-powered vehicle 10. In a case where the first parameter P1 relates to the inclination angle of the traveling road of the human-powered vehicle 10, the first parameter P1 is, for example, the inclination angle of the traveling road of the human-powered vehicle 10. The electronic controller 72 obtains information related to the inclination angle of the human-powered vehicle 10 or the inclination angle of the traveling road of the human-powered vehicle 10 from the inclination detector 54.

Preferably, the predetermined threshold value P1X includes the predetermined first threshold value P11. In a case where the first parameter P1 is less than the predetermined first threshold value P11, the electronic controller 72 controls the shifting device 40 to increase the transmission ratio R. Preferably, the predetermined threshold value P1X includes a predetermined second threshold value P12. In a case where the first parameter P1 is greater than the predetermined second threshold value P12, the electronic controller 72 controls the shifting device 40 to decrease the transmission ratio R. Preferably, the predetermined second threshold value P12 is greater than the predetermined first threshold value P11. In a case of human torque, the first threshold value P11 is in a range of, for example, 20 Nm or greater and 60 Nm or less. In a case of human torque, the second threshold value P12 is in a range of, for example, 40 Nm or greater and 80 Nm or less.

Preferably, in a case where the output of the motor 38 decreases as the vehicle speed V of the human-powered vehicle 10 increases, the electronic controller 72 is configured to decrease the predetermined first threshold value P11. Preferably, in a case where the output of the motor 38 decreases as the vehicle speed V of the human-powered vehicle 10 increases, the electronic controller 72 is configured to decrease the predetermined second threshold value P12.

Figure 6:
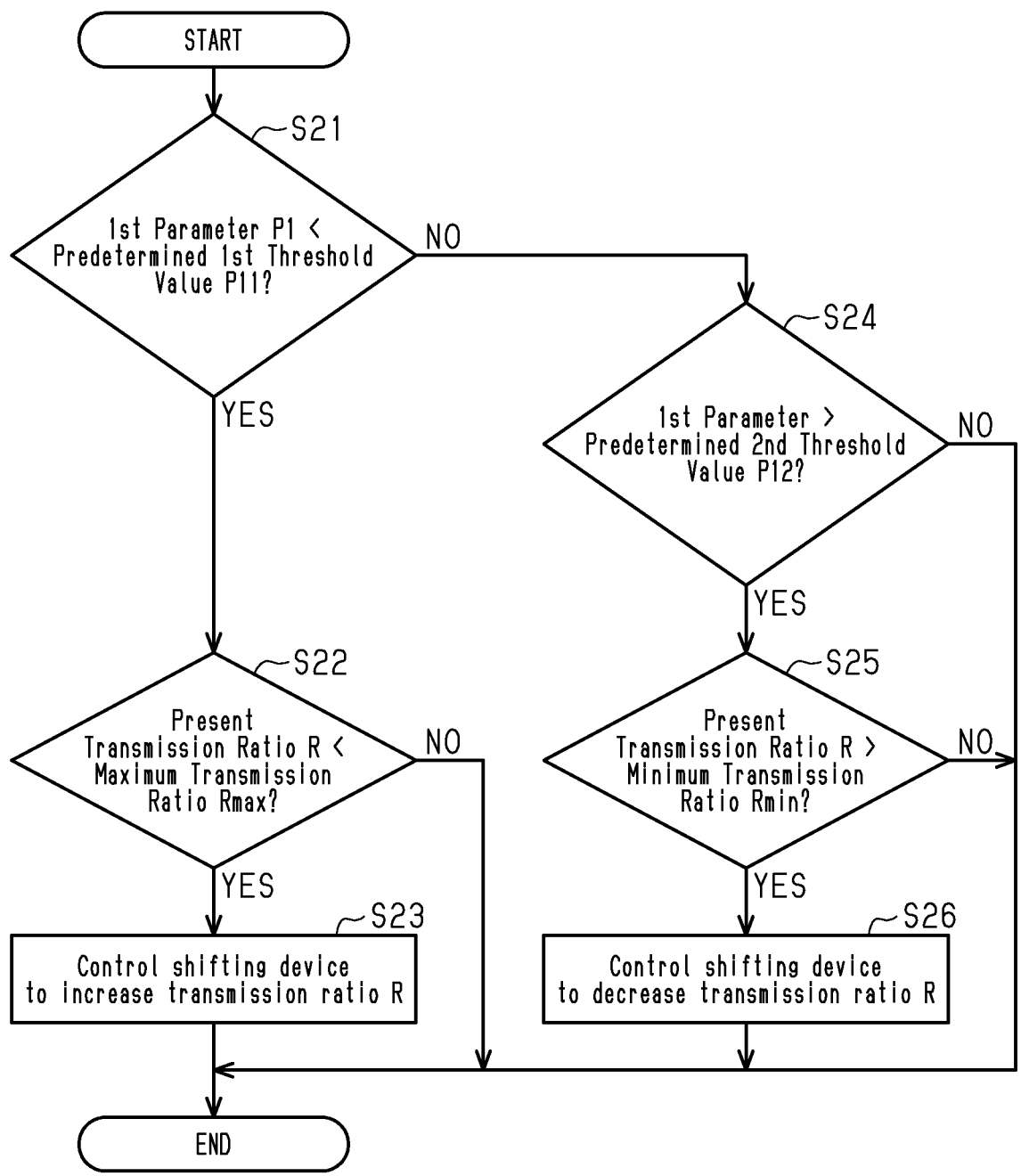
FIG. 6 is a flowchart of a process for controlling the shifting device executed by a second embodiment of an electronic controller.

A process for controlling the shifting device 40 will now be described with reference to FIG. 6. In a case where electric power is supplied to the electronic controller 72, the electronic controller 72 starts the process and proceeds to step S21 of the flowchart illustrated in FIG. 6. In a case where the flowchart shown in FIG. 6 ends, the electronic controller 72 repeats the process from step S21 after a predetermined interval until the supply of electric power stops.

In step S21, the electronic controller 72 determines whether the first parameter P1 is less than the predetermined first threshold value P11. In a case where the first parameter P1 is less than the predetermined first threshold value P11, the electronic controller 72 proceeds to step S22. In step S22, the electronic controller 72 determines whether the present transmission ratio R is less than the maximum transmission ratio Rmax. In a case where the present transmission ratio R is greater than or equal to the maximum transmission ratio Rmax, the electronic controller 72 ends the process. In a case where the present transmission ratio R is less than the maximum transmission ratio Rmax, the electronic controller 72 proceeds to step S23. In step S23, the electronic controller 72 controls the shifting device 40 to increase the transmission ratio R and then ends the process.

In step S21, in a case where the first parameter P1 is greater than or equal to the predetermined first threshold value P11, the electronic controller 72 proceeds to step S24. In step S24, the electronic controller 72 determines whether the first parameter P1 is greater than the predetermined second threshold value P12. In a case where the first parameter P1 is less than or equal to the predetermined second threshold value P12, the electronic controller 72 ends the process. In a case where the first parameter P1 is greater than the predetermined second threshold value P12, the electronic controller 72 proceeds to step S25. In step S25, the electronic controller 72 determines whether the present transmission ratio R is greater than the minimum transmission ratio Rmin. In a case where the present transmission ratio R is less than or equal to the minimum transmission ratio Rmin, the electronic controller 72 ends the process. In a case where the present transmission ratio R is greater than the minimum transmission ratio Rmin, the electronic controller 72 proceeds to step S26. In step S26, the electronic controller 72 controls the shifting device 40 to decrease the transmission ratio R and then ends the process.

The first value P1A and the third value P1C are less than the initial value of the predetermined first threshold value P11 stored in the storage 74. The second value P1B and the fourth value P1D are less than the initial value of the predetermined second threshold value P12 stored in the storage 74. Preferably, the third value P1C is greater than the first value P1A. Preferably, the fourth value P1D is greater than the second value P1B.

Modifications

The description related to the above embodiments exemplifies, without any intention to limit, applicable forms of a human-powered vehicle control device for a human-powered vehicle according to the present disclosure. The human-powered vehicle control device for a human-powered vehicle according to the present disclosure can be applied to, for example, modifications of the embodiments that are described below and combinations of at least two of the modifications that do not contradict each other. In the modifications described hereinafter, same reference characters are given to those elements that are the same as the corresponding elements of the above embodiment. Such elements will not be described in detail.

Figure 4:
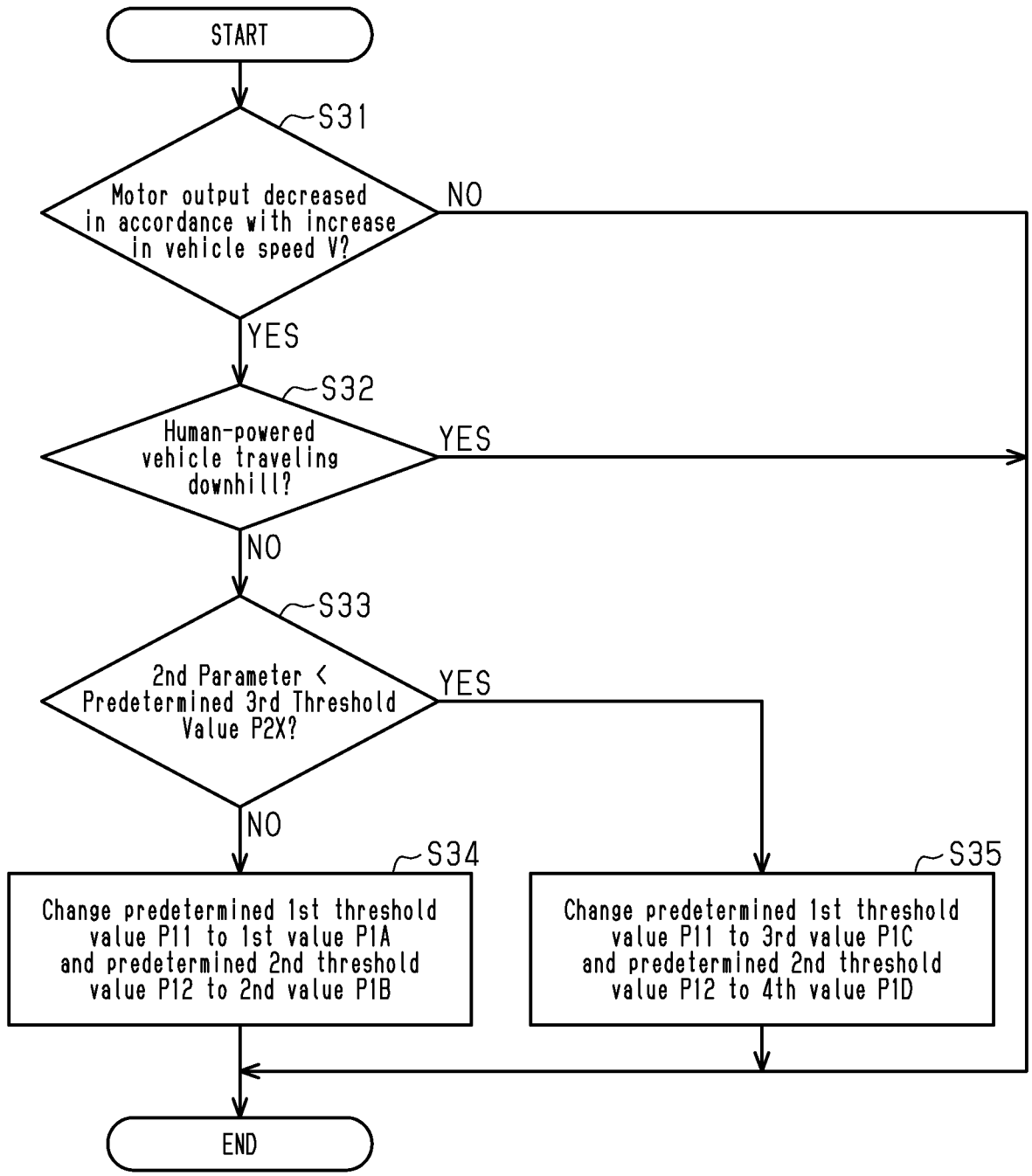
FIG. 4 is a flowchart of a process for changing a predetermined threshold value executed by the electronic controller shown in FIG. 2.

At least one of step S32 and steps S33 and S35 can be omitted from the flowchart shown in FIG. 4. In a case where steps S32, S33, and S35 are omitted and the determination of step S31 is YES, the electronic controller 72 proceeds to step S34. In a case where only step S32 is omitted and the determination of step S31 is YES, the electronic controller 72 proceeds to step S33. In a case where steps S33 and S35 are omitted and the determination of step S32 is NO, the electronic controller 72 proceeds to step S34. As long as the electronic controller 72 is configured to control the shifting device 40 to change the transmission ratio R in accordance with a comparison of a first parameter P1 related to the human-powered vehicle 10 and a predetermined threshold value P1X, and is configured to change the predetermined threshold value P1X in a case where an output of the motor 38 decreases as the vehicle speed V of the human-powered vehicle 10 increases, the remaining configuration can be omitted.

In the first embodiment, the electronic controller 72 can be configured to decrease the predetermined first threshold value P11 in a case where the output of the motor 38 decreases as the vehicle speed V of the human-powered vehicle 10 increases. A decrease in the predetermined first threshold value P11 hampers a decrease in the transmission ratio R, so that the load on the rider is not readily decreased. However, the vehicle speed V is easily maintained while limiting increases in the rotational speed of the crank 12.

In the first embodiment, the electronic controller 72 can be configured to decrease the predetermined second threshold value P12 in a case where the output of the motor 38 decreases as the vehicle speed V of the human-powered vehicle 10 increases. A decrease in the predetermined second threshold value P12 allows the transmission ratio R to be easily increased, so that the load on the rider is readily increased. However, the vehicle speed V is easily increased while limiting increases in the rotational speed of the crank 12.

In the first embodiment, in a case where the output of the motor 38 decreases as the vehicle speed V of the human-powered vehicle 10 increases, the electronic controller 72 can be configured to change only one of the predetermined first threshold value P11 and the predetermined second threshold value P12.

In the second embodiment, the electronic controller 72 can be configured to increase the predetermined first threshold value P11 in a case where the output of the motor 38 decreases as the vehicle speed V of the human-powered vehicle 10 increases. In this case, the transmission ratio R is easily decreased.

In the second embodiment, the electronic controller 72 can be configured to increase the predetermined second threshold value P12 in a case where the output of the motor 38 decreases as the vehicle speed V of the human-powered vehicle 10 increases. In this case, the transmission ratio R is not easily increased.

In the second embodiment, in a case where the output of the motor 38 decreases as the vehicle speed V of the human-powered vehicle 10 increases, the electronic controller 72 can be configured to change only one of the predetermined first threshold value P11 and the predetermined second threshold value P12.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A human-powered vehicle control device for a human-powered vehicle that includes a motor that applies a propulsion force to the human-powered vehicle and a shifting device that is provided in a transmission path of a human driving force and configured to change a transmission ratio, the human-powered vehicle control device comprising:
- an electronic controller configured to control the shifting device to change the transmission ratio in accordance with a comparison of a first parameter related to the human-powered vehicle and a predetermined threshold value,
- the electronic controller is configured to change the predetermined threshold value in a case where an output of the motor decreases as a vehicle speed of the human-powered vehicle increases.

2. The human-powered vehicle control device according to claim 1, wherein
the case where the output of the motor decreases includes a case where the motor is stopped.

3. The human-powered vehicle control device according to claim 1, wherein
the predetermined threshold value includes a predetermined first threshold value, and
the electronic controller is configured to control the shifting device to decrease the transmission ratio in a case where the first parameter is less than the predetermined first threshold value and increase the predetermined first threshold value in a case where the output of the motor decreases as the vehicle speed of the human-powered vehicle increases.

4. The human-powered vehicle control device according to claim 1, wherein
the predetermined threshold value includes a predetermined second threshold value, and
the electronic controller is configured to control the shifting device to increase the transmission ratio in a case where the first parameter is greater than the predetermined second threshold value and increase the predetermined second threshold value in a case where the output of the motor decreases as the vehicle speed of the human-powered vehicle increases.

5. The human-powered vehicle control device according to claim 3, wherein
the first parameter is related to at least one of a rotational speed of a crank of the human-powered vehicle and the vehicle speed of the human-powered vehicle.

6. The human-powered vehicle control device according to claim 1, wherein
the predetermined threshold value includes a predetermined first threshold value, and
the electronic controller is configured to control the shifting device to increase the transmission ratio in a case where the first parameter is less than the predetermined first threshold value and decrease the predetermined first threshold value in a case where the output of the motor decreases as the vehicle speed of the human-powered vehicle increases.

7. The human-powered vehicle control device according to claim 1, wherein
the predetermined threshold value includes a predetermined second threshold value, and
the electronic controller is configured to control the shifting device to decrease the transmission ratio in a case where the first parameter is greater than the predetermined second threshold value and decrease the predetermined second threshold value in a case where the output of the motor decreases as the vehicle speed of the human-powered vehicle increases.

8. The human-powered vehicle control device according to claim 6, wherein
the first parameter is related to at least one of human driving force input to the human-powered vehicle, an inclination angle of the human-powered vehicle, and an inclination angle of a traveling road of the human-powered vehicle.

9. The human-powered vehicle control device according to claim 1, wherein
the electronic controller is configured not to change the predetermined threshold value even if the output of the motor decreases as the vehicle speed of the human-powered vehicle increases in a case where a second parameter related to a traveling resistance of the human-powered vehicle is less than a predetermined third threshold value.

10. The human-powered vehicle control device according to claim 1, wherein
the electronic controller is configured to vary a change amount of the predetermined threshold value in accordance with a second parameter related to a traveling resistance of the human-powered vehicle where the electronic controller changes the predetermined threshold value.

11. The human-powered vehicle control device according to claim 9, wherein
the electronic controller is configured to vary a change amount of the predetermined threshold value in accordance with the second parameter where the electronic controller changes the predetermined threshold value.

12. The human-powered vehicle control device according to claim 10, wherein
where the electronic controller changes the predetermined threshold value, the electronic controller is configured to set a smaller change amount for the predetermined threshold value in a case where the second parameter is less than a predetermined third threshold value as compared to a case where the second parameter is greater than or equal to the predetermined third threshold value.

13. The human-powered vehicle control device according to claim 1, wherein
the electronic controller is configured not to change the predetermined threshold value even if the output of the motor decreases as the vehicle speed of the human-powered vehicle increases in a case where the human-powered vehicle is traveling downhill.

14. The human-powered vehicle control device according to claim 1, wherein
the electronic controller is configured to change the predetermined threshold value in steps where the electronic controller changes the predetermined threshold value.

15. The human-powered vehicle control device according to claim 1, wherein
the electronic controller is configured to change the predetermined threshold value so that a change amount of the predetermined threshold value in a predetermined period is less than or equal to a predetermined change amount where the electronic controller changes the predetermined threshold value.

16. The human-powered vehicle control device according to claim 1, wherein
the electronic controller is configured to control the motor in a first control state and a second control state that differ from each other in output characteristic of the motor with respect to human driving force input to the human-powered vehicle, and the electronic controller is configured to set a change amount of the predetermined threshold value differently for a case where the electronic controller changes the predetermined threshold value in the first control state and a case where the electronic controller changes the predetermined threshold value in the second control state.

17. The human-powered vehicle control device according to claim 1, wherein
the electronic controller is configured to control the motor in accordance with a human driving force input to the human-powered vehicle.

18. The human-powered vehicle control device according to claim 16, wherein
the electronic controller is configured to control the motor in accordance with a human driving force input to the human-powered vehicle and switch between the first control state and the second control state in accordance with an input from an operation device.

\* \* \* \* \*